(12) United States Patent
Binder et al.

(10) Patent No.: US 10,759,230 B2
(45) Date of Patent: Sep. 1, 2020

(54) PNEUMATIC VEHICLE TIRE

(71) Applicant: Continental Reifen Deutschland GmbH, Hannover (DE)

(72) Inventors: Axel Binder, Hannover (DE); Gerrit Bolz, Neustadt am Ruebenberge (DE)

(73) Assignee: CONTINENTAL REIFEN DEUTSCHLAND GMBH, Hannover (DE)

(*) Notice: Subject to any disclaimer, the term of this patent is extended or adjusted under 35 U.S.C. 154(b) by 296 days.

(21) Appl. No.: 15/873,685

(22) Filed: Jan. 17, 2018

(65) Prior Publication Data

US 2018/0141383 A1    May 24, 2018

Related U.S. Application Data

(63) Continuation of application No. PCT/EP2016/054720, filed on Mar. 7, 2016.

(30) Foreign Application Priority Data

Jul. 17, 2015    (DE) .................. 10 2015 213 497

(51) Int. Cl.
*B60C 11/00* (2006.01)
*B60C 19/08* (2006.01)
*B60C 9/00* (2006.01)
*B60C 9/18* (2006.01)

(52) U.S. Cl.
CPC ............ *B60C 11/005* (2013.01); *B60C 9/005* (2013.01); *B60C 9/0042* (2013.01); *B60C 9/18* (2013.01); *B60C 19/082* (2013.01); *B60C 19/084* (2013.01); *B60C 9/1807* (2013.01)

(58) Field of Classification Search
CPC ...... B60C 11/005; B60C 9/0042; B60C 9/005
See application file for complete search history.

(56) References Cited

U.S. PATENT DOCUMENTS 5,942,069 A * 8/1999 Gerresheim ............ B60C 11/18
152/152.1
7,188,654 B2    3/2007 Dehnert et al.

FOREIGN PATENT DOCUMENTS

DE         19850766 B4      1/2004
DE      102012009829 A1    11/2012
JP         2014015094 A  *  1/2014
(Continued)

OTHER PUBLICATIONS

International Search Report dated Jun. 9, 2016 of international application PCT/EP2016/054720 on which this application is based.

*Primary Examiner* — Jacob T Minskey
*Assistant Examiner* — Melody Tsui
(74) *Attorney, Agent, or Firm* — Gregory Adams; David Cate

(57) ABSTRACT

A pneumatic vehicle tire has at least a tread with an outer tread cap with a profiled tread surface, an inner tread base and at least one electrically conductive conductivity strip. The conductivity strip extends in a radial direction from the tread base, through the tread cap, to the tread surface. The tire further includes an electrically non-conductive belt bandage arranged under the tread base and the belt bandage has a multiplicity of gaps, a multi-ply belt, a carcass and side walls. The gaps in the belt bandage are filled with an electrically conductive material.

20 Claims, 2 Drawing Sheets

(56) References Cited

FOREIGN PATENT DOCUMENTS

| | | |
|---|---|---|
| JP | 2014015094 A | 1/2014 |
| JP | 2015013633 A | 1/2015 |

\* cited by examiner

PNEUMATIC VEHICLE TIRE

CROSS REFERENCE TO RELATED APPLICATIONS

This application is a continuation application of international patent application PCT/EP2016/054720, filed Mar. 7, 2016 designating the United States and claiming priority from German application 10 2015 213 497.0, filed Jul. 17, 2015, and the entire content of both applications is incorporated herein by reference.

FIELD OF THE INVENTION

The invention relates to a conductive pneumatic vehicle tire.

BACKGROUND OF THE INVENTION

During operation, motor vehicles can become electrostatically charged. This can be due, for example, to mechanical friction between two components, for example, a rotating shaft in the transmission, or due to the friction of the tread surfaces of the pneumatic vehicle tires as they roll on the road. Normally, the electrostatic charge is dissipated to the road via the pneumatic vehicle tires. This is possible because the materials of which they are composed include electrically conductive materials, especially rubber compounds. If the electrostatic charge is not dissipated from the motor vehicle, the electronics of the motor vehicle may be compromised, for example. There are legal requirements for the electrical resistance of a motor vehicle. The total resistance, measured between the tread surface of the pneumatic vehicle tire and the rim, should not exceed $10^{+6}\Omega$, that is, the pneumatic vehicle tire must be conductive.

It is furthermore known that the fundamental characteristics of the pneumatic vehicle tire, such as grip, rolling resistance and flexibility, can be improved by using materials with a high proportion of silicon dioxide, particularly in the rubber compound of the tread. The use of silicon dioxide ($SiO_2$), which is also referred to as "silica" or "silicic acid", stabilizes the network of bonds between the individual substances in a rubber compound. In comparison with the conventional structure comprising two nodes (sulfur and carbon), the three-node structure formed in this way (sulfur, carbon and silicate) increases the strength of the material. Furthermore, the use of silicon dioxide improves the adhesion of the pneumatic vehicle tire on the roadway since the rubber compound can be made softer owing to its higher strength.

However, the use of silicon dioxide has the disadvantage that the electrical conductivity of the pneumatic vehicle tire decreases. Since the electrostatic charges are dissipated from the motor vehicle essentially via the pneumatic vehicle tires, the use of silicon dioxide, which has lower or only slight conductivity, is therefore problematic. With an increasing proportion of silicon dioxide in the rubber compound of the tread, the pneumatic vehicle tire has a lower electrical conductivity or a higher electrical resistance than pneumatic vehicle tires with a higher proportion of carbon black in the tread.

A pneumatic vehicle tire having the characteristics described above comprises at least a tread with an outer electrically non-conductive tread cap with a profiled tread surface, an inner tread base and a non-conductive belt bandage as an intermediate ply of a woven type between the tread base and the belt arranged thereunder. The proportion of silicon dioxide in the pneumatic vehicle tire is increased, in particular, by means of the belt bandage including silicon dioxide, thereby improving the characteristics of the pneumatic vehicle tire. The tread base and the tread cap are also referred to by specialists in this area as the "base" and the "cap".

To improve electrical conductivity, the formation of a plurality of electrically conductive conductivity strips, referred to as "carbon center beams" (CCB), on the base of the tread is already known. These conductivity strips extend in a radial direction from the base, through the outer tread cap, to the tread surface and thus form an electrical connection to the road surface. Another known practice is that of forming a multiplicity of gaps or openings in the electrically non-conductive belt bandage, the openings bridging the electrical connection between the pneumatic vehicle tire and the road surface.

DE 198 50 766 B4 discloses a pneumatic vehicle tire having a belt and a tread arranged between the belt and the tread surface. The tread is constructed from a radially outer and a radially inner rubber ply, wherein the radially inner rubber ply has two regions of different rubber compounds. In addition, a further region is formed, which extends from the belt to the tread surface and is composed of a conductive rubber compound containing a high proportion of carbon black. Here, the radially outer rubber ply corresponds to the non-conductive tread cap and the radially inner rubber ply corresponds to the conductive tread base. The further region forms an electrically conductive connection between the base and the tread surface of the pneumatic vehicle tire or the road surface.

Moreover, U.S. Pat. No. 5,942,069 discloses a pneumatic vehicle tire having a tread composed of an electrically non-conductive material or a material of poor conductivity that has a profiled tread surface and an inner electrically conductive tread base. The pneumatic vehicle tire described here is distinguished by at least one radially projecting, integrally formed extension of the tread base, which extends radially outward from the tread base to the tread surface.

U.S. Pat. No. 7,188,654 furthermore discloses a pneumatic vehicle tire containing a belt bandage comprising a ply that has strengthening members embedded in an unvulcanized rubber compound, wherein the strengthening members run substantially parallel to one another within the ply and are hybrid cords, which are constructed from a first twisted yarn with a high elastic modulus and a second twisted yarn with a low elastic modulus, which are twisted together at the ends.

SUMMARY OF THE INVENTION

It is an object of the invention to provide a pneumatic vehicle tire of improved electrical conductivity without simultaneously compromising the other characteristics of the pneumatic vehicle tire.

A pneumatic vehicle tire at least having a tread with an outer tread cap (also referred to as the "cap" for short below) with a profiled tread surface, an inner tread base (also referred to as the "base" for short below) and at least one electrically conductive conductivity strip, which extends in a radial direction from the tread base, through the tread cap, to the tread surface, an electrically non-conductive belt bandage, which is arranged under the tread base and has a multiplicity of gaps, a multi-ply belt, a carcass and side walls, has been improved according to the invention such that the gaps in the belt bandage are filled with an electrically conductive material.

In the case of the pneumatic vehicle tire according to the invention, the tread surface of the pneumatic vehicle tire is formed by the cap, which is conventionally composed of a non-conductive rubber compound. The base of the tread is arranged under the cap. This can be formed from at least one rubber compound filled with carbon black, for example, and is thus conductive. As an alternative, the base can be formed from a non-conductive material, in particular a non-conductive rubber compound. At least one electrically conductive conductivity strip, or CCB for short, is formed on the base. If the base is formed from a conductive material, the conductivity strip is preferably formed from the same conductive material as the base. In particular, the conductivity strips and the base can be formed as a single component, that is, integrally, in this embodiment. The conductivity strips project in a radial direction from the base, through the cap, to the outer tread surface of the pneumatic vehicle tire and thus provide electrical contact with the road surface. In the pneumatic vehicle tire according to the invention, the non-conductive belt bandage is furthermore arranged under the base, that is, between the base and the belt. The belt bandage is formed from a non-conductive material, in particular from a rubber compound comprising at least silicon dioxide.

In order to ensure the electrical conductivity of the pneumatic vehicle tire, even with a high proportion of silicon dioxide, the belt bandage has a multiplicity of gaps, holes or openings. In the context of this invention, the term "gap" is understood to mean an aperture which passes through the belt bandage. By means of these openings, electrical contact is established between the belt and the base and, by means of the conductivity strips, also with the road surface. The electrostatic charge of the vehicle can thus be dissipated in an advantageous manner to the road surface, even in the case of pneumatic vehicle tires which are composed primarily of a non-conductive material or a material which has poor conductivity.

According to the invention, the gaps are filled with an electrically conductive material in order to further improve the electrical conductivity of the pneumatic vehicle tire. In this case, a general embodiment of the invention provides that the gaps are filled with an electrically conductive rubber compound. A further development of this embodiment provides that the gaps are filled with the same material as the tread base. This embodiment can be implemented, for example, if, in the production process for the pneumatic vehicle tire, the base is mounted on the belt bandage and the rubber compound of the base penetrates into the gaps in the belt bandage.

According to the configuration of the base, already mentioned above, from a non-conductive material, the at least one conductivity strip is correspondingly preferably composed of a different electrically conductive material than the tread base. For example, this can be a conductive rubber compound. As an advantageous possibility, the conductivity strips can be formed from the same conductive material as that with which the gaps are filled. Consequently, electrical contact between the pneumatic vehicle tire and the road surface can be ensured, despite the non-conductive base.

The belt bandage is preferably formed from a woven fabric. In the production of the pneumatic vehicle tire, the belt bandage is wound or coiled around the belt of the pneumatic vehicle tire. During this process, the coil pattern according to the invention of the belt bandage including woven threads and gaps is formed. One embodiment provides that the belt bandage has at least one ply of a woven fabric. According to the invention, a belt bandage having one or two plies is preferred. The woven fabric of the belt bandage can be formed from one of the following materials, for example: nylon (N) or hybrid materials composed of nylon (N) and aramid (A). For example, nylon with a thickness or fineness, measured in dtex, of N470x2, N940x1, N940x2, N1400x1, N1400x2 or as a hybrid material A1680x2/N470x1, A1680x1/N1100x1, A1100x1/N1100x1, where x1 stands for a single cord and x2 stands for a dual cord, is suitable.

The gaps in the belt bandage advantageously form a total area of at least 10 $mm^2$. This means that at least 10 $mm^2$ of the belt can advantageously be seen, that is, are not covered by the belt bandage, between the outer ends of the coil pattern over the entire circumference of the pneumatic vehicle tire.

One embodiment thereof furthermore provides that precisely one ply is formed in the center of the belt bandage and the belt bandage covers an area of 30 to 99% of the tread. Here, "center" is understood to mean a region which is at least 10 mm away from the outer ends of the belt.

In another embodiment, one or two plies are formed in the center of the belt bandage and an area of 95 to 190% is covered in total. Here, the percentage figure of 190% is intended to illustrate that certain regions of the belt bandage can also be covered by both plies.

The gaps can be configured to be continuous in the circumferential direction of the pneumatic vehicle tire. For example, the gaps are spiral-shaped in the circumferential direction, that is, are formed with an axial offset, or in a ring shape, that is, without an axial offset. This is dependent on the manner in which the woven fabric of the belt bandage is coiled onto the belt. According to another embodiment of the belt bandage, the gaps are formed at regular intervals from one another. Moreover, the gaps can be formed in groups in the belt bandage, that is, there are at least two gaps, preferably at least three gaps, arranged adjacent to one another, and then the next gap or group of gaps is arranged at an interval. Accordingly, the gaps can be formed in groups at regular intervals from one another. A group of gaps comprises at least two gaps, preferably at least three gaps.

In one embodiment of the invention, the gaps have a width of 0.2 to 1.5 cm. Gaps with a width of 1 cm have proven to be a particularly preferred embodiment for improving the conductivity of the pneumatic vehicle tire according to the invention. The distance between two adjacent gaps or two adjacent groups of gaps is preferably from 0.2 to 1.5 cm. One particular embodiment of the invention provides that the width of a gap is equal to the distance between two adjacent gaps. However, the width of a gap is preferably less than the distance between two gaps.

In an advantageous embodiment, the carcass of the pneumatic vehicle tire has electrically conductive carcass cords, for example, made from steel or carbon fibers. These increase the electrical conductivity of the pneumatic vehicle tire. According to a further-reaching concept of the invention, electrical contact is formed between the conductivity strips and the electrically conductive carcass cords of the carcass by the gaps. More specifically, the filled gaps of the belt bandage extend as far as the carcass cords. The electrical conductivity of the pneumatic vehicle tires and the electrical contact between the pneumatic vehicle tires and the road can thereby be improved even further. By means of this embodiment, it is possible to avoid the problem resulting from the fact that the side walls of conventional pneumatic vehicle tires are normally formed from an electrically non-conductive rubber compound. Despite the non-conductive side walls, electrical contact with the road surface is thus ensured.

The invention will be discussed in more detail below on the basis of the appended drawings. Here, the embodiment shown does not represent a restriction to the illustrated variant, but rather serves merely for the explanation of a principle of the invention. Identical or similar components are always denoted by the same reference designations. To be able to illustrate the function according to the invention, the figures show only highly simplified diagrammatic illustrations, in which components not essential to the invention have been omitted. However, this does not mean that such components are not present in a solution according to the invention.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
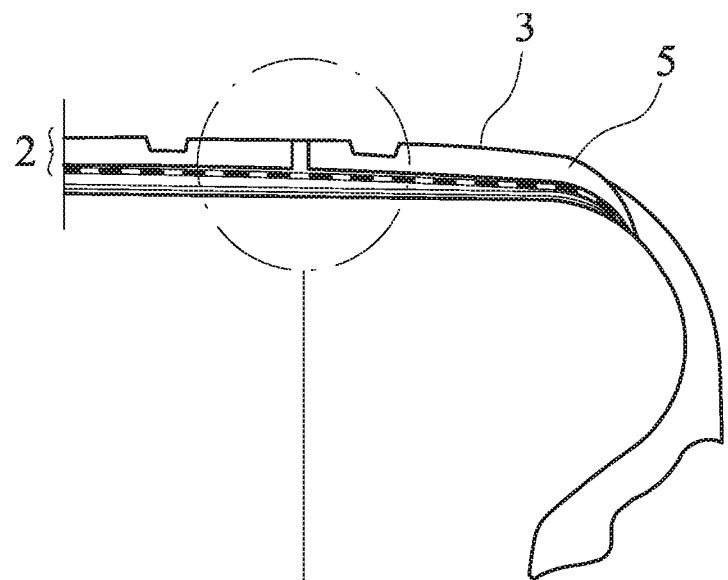
FIG. 1 shows a section transversely to the running direction through part of a pneumatic vehicle tire according to the invention.

FIG. 1 shows a section through part of a pneumatic vehicle tire transversely to the running direction thereof. The outer tread 2 with the profiled tread surface 3 is formed from the tread base 4 (base) with a plurality of conductivity strips 6 and the tread cap 5, wherein only one conductivity strip 6 is shown in the detail.

In the embodiment shown here by way of example, the cap 5 is composed of a non-conductive rubber compound with a high proportion of silicon dioxide, and the base 4 is composed of a conductive rubber compound filled with carbon black. The non-conductive belt bandage 7, the belt 9, the multi-ply carcass 10 and the inner layer 11 are incorporated underneath the tread 2. These different components of the pneumatic vehicle tire are shown on an enlarged scale in FIG. 2.

Figure 2:
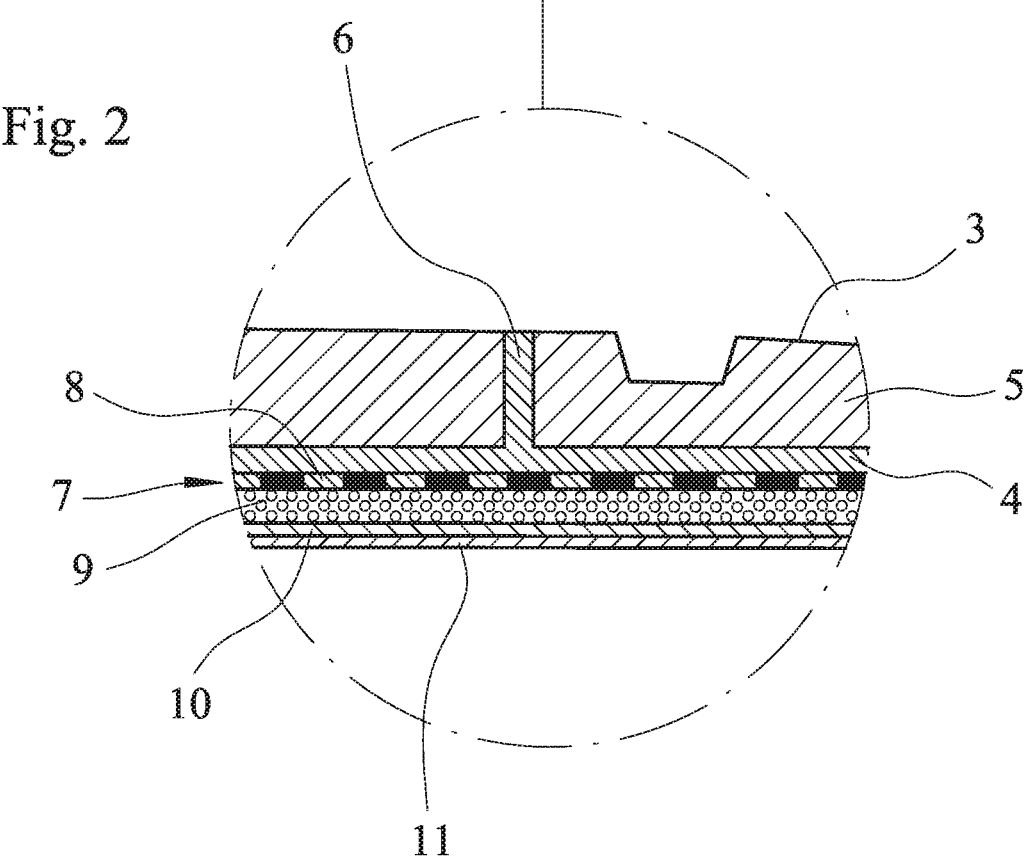
FIG. 2 shows a detail of FIG. 1 on an enlarged scale.

A large-scale detail of the pneumatic vehicle tire according to FIG. 1 is shown in the region of a conductivity strip 6 in FIG. 2. The conductivity strip 6 and the base 4 are formed integrally from the same material. A multiplicity of gaps 8 is formed in the belt bandage 7, forming an interruption in the belt bandage 7. The gaps are formed as the belt bandage 7 in the form of a woven fabric is wound onto the belt 9. According to the invention, the gaps 8 are filled with an electrically conductive material. In the embodiment shown here, this is the same material as the base 4, which penetrates into the gaps 8 during the production process for the pneumatic vehicle tire. Electrical contact between a road surface (not shown here) and the carcass 10 is established via the gaps 8.

Figure 3:
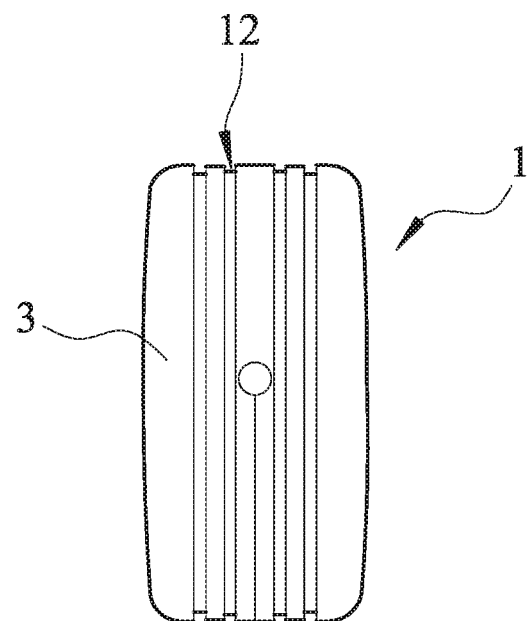
FIG. 3 shows a plan view of the tread surface of the pneumatic vehicle tire.

FIG. 3 shows a plan view of the tread surface 3 of the pneumatic vehicle tire 1. In this embodiment, profiling in the form of four circumferential grooves 12 is introduced into the tread surface 3.

Figure 4:
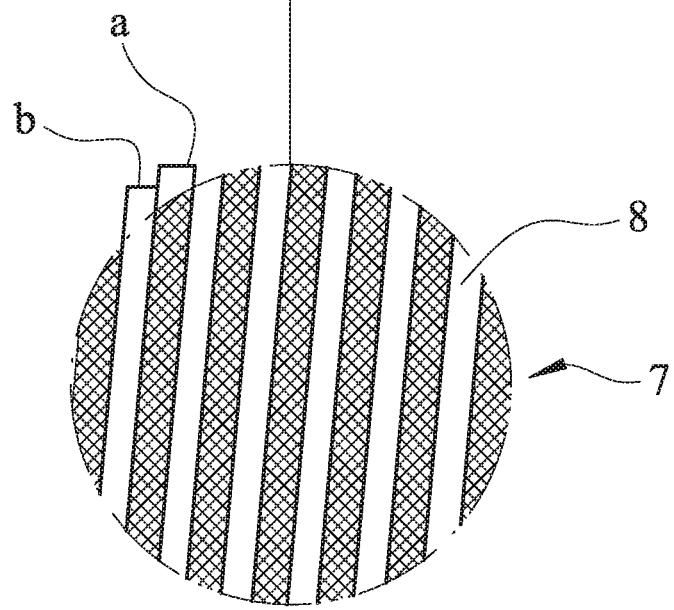
FIG. 4 shows a detail of the pneumatic vehicle tire of FIG. 3 on an enlarged scale; and, FIG. 5 shows two simplified diagrammatic illustrations of the sequence of gaps in the belt bandage.

FIG. 4 shows a detail of the pneumatic vehicle tire according to FIG. 3 on an enlarged scale. The detail furthermore illustrates a plan view of the belt bandage 7. In this embodiment, the gaps 8 are of continuous configuration in the circumferential direction. In this case, the gaps 8 are spaced apart at regular intervals. In this embodiment, the width b of a gap 8 is 1.0 cm, wherein the width b of a gap 8 is equal to the distance a between two gaps 8.

Figure 5:
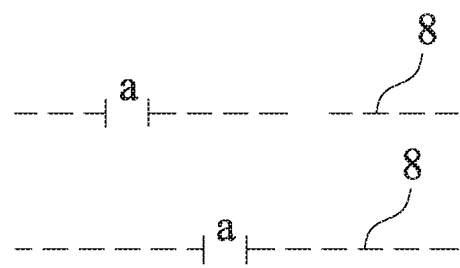

FIG. 5 furthermore shows two simplified diagrammatic illustrations of the sequence of gaps 8 in the belt bandage 7 by way of example. In the upper illustration, groups of three gaps 8 are in each case formed at regular intervals a, while, in the lower illustration, groups of eight gaps 8 at regular intervals a are shown.

It is understood that the foregoing description is that of the preferred embodiments of the invention and that various changes and modifications may be made thereto without departing from the spirit and scope of the invention as defined in the appended claims.

LIST OF REFERENCE SIGNS

1 Pneumatic vehicle tire
2 Tread
3 Tread surface
4 Tread base
5 Tread cap
6 Conductivity strip (CCB)
7 Belt bandage
8 Gap
9 Belt
10 Carcass
11 Inner layer
12 Circumferential groove
a Distance between two adjacent gaps or groups of gaps
b Width of a gap

What is claimed is:

1. A pneumatic vehicle tire comprising:
a tread including: an outer tread cap defining a profiled tread surface; an inner tread base; and, at least one electrically conductive conductivity strip;
said conductivity strip extending in a radial direction from said inner tread base through said outer tread cap to said profiled tread surface;
an electrically non-conductive belt bandage arranged below said inner tread base and having a plurality of gaps formed therein;
said plurality of gaps of said belt bandage being filled with electrically conductive material;
a multi-layered belt;
a carcass;
side walls; and
wherein said tread base is made of a first electrically conductive material; and,
said at least one electrically conductive conductivity strip is made of a second electrically conductive material different from said first electrically conductive material of said the tread base.

2. The pneumatic vehicle tire of claim 1, wherein said electrically conductive material of said plurality of gaps is an electrically conductive rubber mixture.

3. The pneumatic vehicle tire of claim 1, wherein said tread base is made of a predetermined material; and, said gaps are filled with said predetermined material.

4. The pneumatic vehicle tire of claim 1, wherein said belt bandage includes at least one ply of a woven fabric.

5. The pneumatic vehicle tire of claim 4, wherein said woven fabric of said belt bandage is formed from one of the following: nylon or a hybrid material of nylon and aramid.

6. The pneumatic vehicle tire of claim 1, wherein said gaps form a total area of at least 10 mm².

7. The pneumatic vehicle tire of claim 1, wherein at least one of said gaps has a width (b) lying in a range of 0.2 to 1.5 cm.

8. The pneumatic vehicle tire of claim 7, wherein said width (b) of said one gap is 1.0 cm.

9. A pneumatic vehicle tire comprising:
a tread including: an outer tread cap defining a profiled tread surface; an inner tread base; and, at least one electrically conductive conductivity strip;
said conductivity strip extending in a radial direction from said inner tread base through said outer tread cap to said profiled tread surface;
an electrically non-conductive belt bandage arranged below said inner tread base and having a plurality of gaps formed therein;
said plurality of gaps of said belt bandage being filled with electrically conductive material;
a multi-layered belt;
a carcass;
side walls; and
wherein two mutually adjacent ones of said gaps are separated by a distance lying in the range of 0.2 to 1.5 cm.

10. A pneumatic vehicle tire comprising:
a tread including: an outer tread cap defining a profiled tread surface; an inner tread base; and, at least one electrically conductive conductivity strip;
said conductivity strip extending in a radial direction from said inner tread base through said outer tread cap to said profiled tread surface;
an electrically non-conductive belt bandage arranged below said inner tread base and having a plurality of gaps formed therein;
said plurality of gaps of said belt bandage being filled with electrically conductive material;
a multi-layered belt;
a carcass;
side walls;
wherein said plurality of gaps are formed at regular intervals from one another;
wherein said plurality of gaps are subdivided into groups formed to be at regular intervals from one another; and
wherein two mutually adjacent ones of said groups are separated by a distance lying in a range of 0.2 to 1.5 cm.

11. The pneumatic vehicle tire of claim 1, wherein said carcass includes electrically conductive carcass cords; and, said gaps filled with electrically conductive material form an electrical contact between said electrically conductive cords and said electrically conductive strip.

12. The pneumatic vehicle tire of claim 9 wherein said tread base is made of a first electrically conductive material; and,
said at least one electrically conductive conductivity strip is made of a second electrically conductive material different from said first electrically conductive material of said the tread base.

13. The pneumatic vehicle tire of claim 1, wherein the electrically conductive material of the plurality of gaps is the first electrically conductive material.

14. The pneumatic vehicle tire of claim 1, wherein the plurality of gaps establishes electrical contact between a road and the carcass.

15. The pneumatic vehicle tire of claim 1, further comprising a plurality of circumferential grooves formed in the profiled tread surface.

16. The pneumatic vehicle tire of claim 1, wherein the plurality of gaps are continuous in a circumferential direction.

17. The pneumatic vehicle tire of claim 1, wherein the plurality of gaps are arranged in a sequence of three gaps and/or eight gaps.

18. The pneumatic vehicle tire of claim 9, wherein said electrically conductive material of said plurality of gaps is an electrically conductive rubber mixture.

19. The pneumatic vehicle tire of claim 10, wherein said belt bandage includes at least one ply of a woven fabric.

20. The pneumatic vehicle tire of claim 10, wherein the plurality of gaps establishes electrical contact between a road and the carcass.

* * * * *